(12) United States Patent
Snead

(10) Patent No.: US 10,501,144 B2
(45) Date of Patent: Dec. 10, 2019

(54) BICYCLE LEVER ASSEMBLY ADJUSTMENT DEVICE

(71) Applicant: SRAM, LLC, Chicago, IL (US)

(72) Inventor: Braden T. Snead, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 429 days.

(21) Appl. No.: 14/933,673

(22) Filed: Nov. 5, 2015

(65) Prior Publication Data

US 2017/0129567 A1 May 11, 2017

(51) Int. Cl.
*B62L 3/02* (2006.01)
*B62K 23/06* (2006.01)

(52) U.S. Cl.
CPC .............. *B62L 3/02* (2013.01); *B62K 23/06* (2013.01); *B62L 3/023* (2013.01)

(58) Field of Classification Search
CPC . B62L 3/02; B62L 3/023; B62K 23/06; B60T 17/043; B60T 11/165; B60T 7/102
USPC ........................................................ 188/344
See application file for complete search history.

(56) References Cited

U.S. PATENT DOCUMENTS

| 6,987,534 | B1 | 1/2006 | Seta | |
|---|---|---|---|---|
| 7,487,638 | B2 * | 2/2009 | Tetsuka | B62L 3/023 60/553 |
| 7,857,112 | B1 * | 12/2010 | Tsai | B60T 11/18 188/344 |
| 2003/0121262 | A1 * | 7/2003 | Lumpkin | B60T 11/22 60/594 |
| 2005/0056508 | A1 * | 3/2005 | Laghi | B60T 11/22 188/344 |
| 2005/0199450 | A1 * | 9/2005 | Campbell | B60T 11/22 188/24.15 |
| 2008/0155982 | A1 * | 7/2008 | Jones | B60T 11/22 60/588 |
| 2008/0245632 | A1 * | 10/2008 | Watarai | B62L 3/023 188/344 |
| 2008/0302101 | A1 * | 12/2008 | Dunlap | B60T 7/102 60/594 |
| 2010/0051400 | A1 * | 3/2010 | Yang | B60T 7/102 188/344 |
| 2011/0048873 | A1 * | 3/2011 | Wang | B60T 7/102 188/72.6 |
| 2011/0155525 | A1 * | 6/2011 | Yang | B60T 7/102 188/344 |

(Continued)

FOREIGN PATENT DOCUMENTS

| DE | 202014100854 U1 * | 7/2014 |
|---|---|---|
| EP | 0405945 A2 * | 1/1991 |
| WO | WO 2012143258 A2 * | 10/2012 |

OTHER PUBLICATIONS

"R1 Racing", Formula, 2013.
Formula S.R.L., "R1Racing Master Cylinder—Pompa R1Racing—MY2012/MY2013", Sep. 1, 2013, 11 pages.

*Primary Examiner* — Vinh Luong

(57) ABSTRACT

A lever assembly for a bicycle may be adjustable. The lever assembly may include an anchoring member, a rod coupled to the anchoring member, and a retaining device applying a clamping force to the anchoring member. The retaining device may include a first extension and a second extension configured to obstruct rotation of the rod about a longitudinal axis of the rod.

20 Claims, 16 Drawing Sheets

(56) References Cited

U.S. PATENT DOCUMENTS

| | | | |
|---|---|---|---|
| 2014/0041379 A1* | 2/2014 | Ruckh | B62L 3/023 60/594 |
| 2015/0266540 A1* | 9/2015 | Snead | B62K 23/06 188/344 |
| 2016/0264213 A1* | 9/2016 | Swanson | B62L 3/023 |
| 2017/0106939 A1* | 4/2017 | Snead | B62L 1/00 |

* cited by examiner

BICYCLE LEVER ASSEMBLY ADJUSTMENT DEVICE

BACKGROUND

A traditional bicycle may include a lever actuated brake system to provide and/or control the braking forces exerted by the system. Typically, the lever is coupled with a mechanical, hydraulic, electronic, or other type of brake actuating system. The lever is generally placed in convenient position for a rider to actuate the lever using one or more hands, such as by placing the control device including the lever on the handlebars of the bicycle. Different handlebar configurations and geometries are used by different riders having different sized and shaped hands. These different combinations of riders and handlebars can cause levers to be placed in non-optimal positions for some rider-handlebar combinations.

SUMMARY

In an embodiment, a lever assembly for a bicycle includes an anchoring member, a lever pivotably coupled to the anchoring member, and a rod threadably coupled to the anchoring member. The lever assembly also includes a retaining device disposed around a portion of the anchoring member, the retaining device including a first extension and a second extension configured to obstruct rotation of the rod about a longitudinal axis of the rod.

In an embodiment, a control lever assembly for a bicycle includes an anchoring member, a lever coupled to the anchoring member, and a rod adjustably coupled to the anchoring member. The control lever also includes a retaining device coupled to the anchoring member and operatively coupled to the rod to apply a clamping force to bias the rod against rotation about a longitudinal axis of the rod.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

A bicycle may employ an adjustable lever based control device, such as a brake assembly, to enable a rider to slow or stop the bicycle. The lever based brake assembly may be hydraulically actuated, such as with a piston pressuring system, mechanically actuated such as with a cable pulling device, or actuated through other techniques such as electronic or pneumatic actuation. The brake assembly employs a lever operatively coupled to a handlebar of the bicycle. A user grasps and actuates the lever to actuate the hydraulic brake assembly. However, a distance between the lever and the handlebar (i.e., a "reach" of the lever) may be too short for riders with large hands and too long for riders with small hands. To accommodate a wide variety of hand sizes, the lever may include an adjustable rod or screw that enables a rider to adjust the reach of the lever. Example lever and/or rod adjustment mechanisms disclosed herein enable adjustment of the reach of levers of bicycle control devices, such as brake assemblies. The adjustment mechanisms also substantially prevent unwanted variation or creep of the reach (e.g., lengthening or shortening) during operation of the bicycle. In some embodiments, the adjustment mechanisms index reach adjustments of the lever.

An adjustment mechanism may include a retaining device wrapped or otherwise disposed around a portion of an anchoring member. The retaining device may provide a clamping force to an adjustment rod, or rod assembly. For example, the clamping force may involve the application of two or more forces on opposing sides of the rod by the retaining device. The clamping force may be applied by a first extension and a second extension that are configured to obstruct rotation of the rod about a longitudinal axis of the rod. For example, portions and/or sections of the first and second extension may be in contact with a mating section of, or attached to, the rod, and the clamping force may be applied using the extensions.

Figure 1:
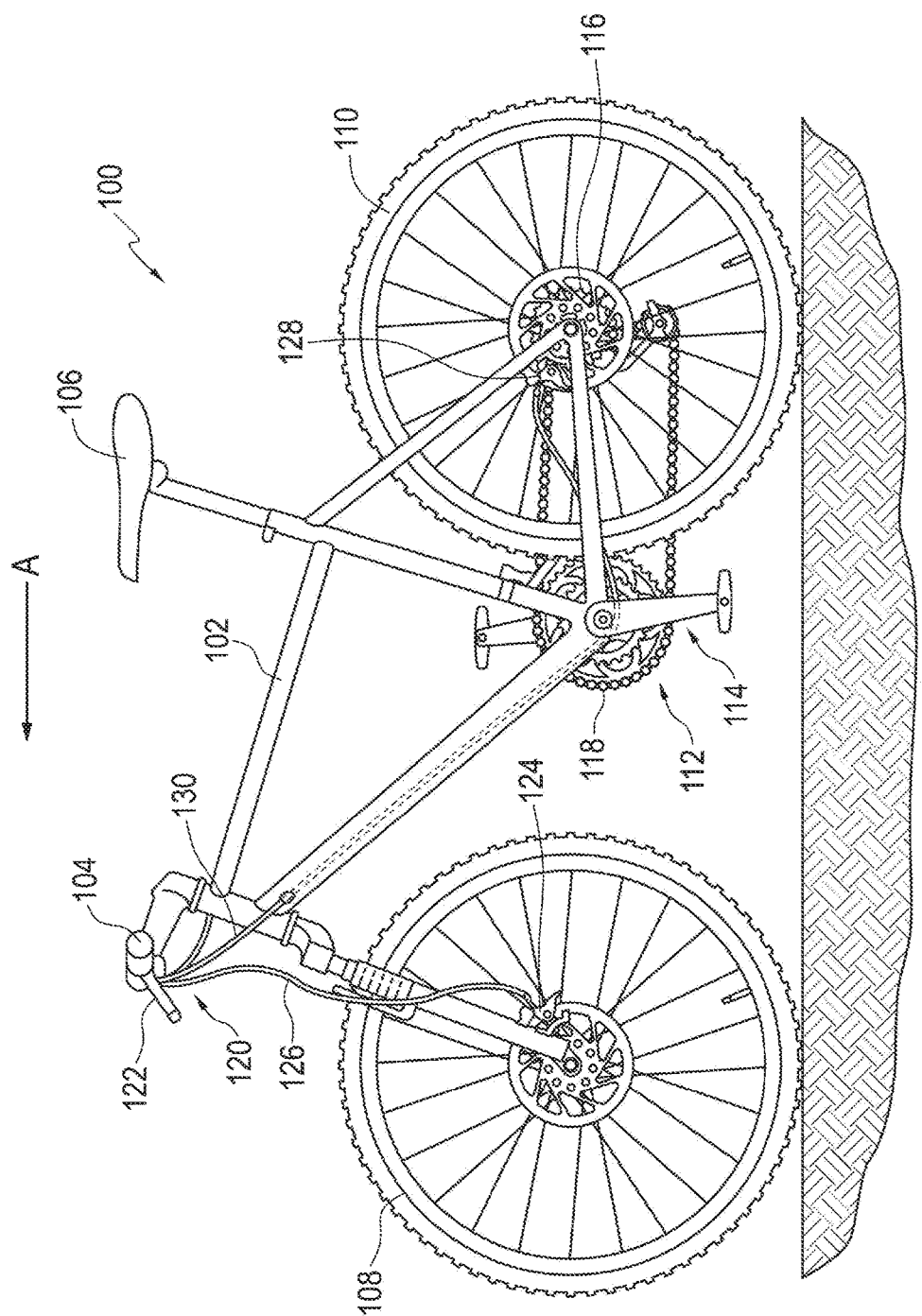
FIG. 1 is a side elevational view of a bicycle, which may be used to employ braking control devices having an adjustable lever assembly as disclosed herein.

FIG. 1 illustrates an exemplary bicycle 100, which may be used to implement adjustment mechanisms disclosed herein. In the illustrated embodiment, the bicycle 100 includes a frame 102, handlebars 104, and a seat 106. The bicycle 100 also includes a first or front wheel 108 and a second or rear wheel 110. The bicycle 100 includes a drive train 112. The drive train 112 of FIG. 1 includes a crank assembly 114 operatively coupled to a rear cog assembly such as a cassette 116 via a chain 118. While the illustrated bicycle 100 is a mountain bicycle, the embodiments disclosed herein may be implemented with other types of bicycles such as, for example, road bicycles. The front and/or forward orientation of the bicycle 100 is indicated by the direction of arrow "A". As such, a forward direction of movement for the bicycle is indicated by the direction of arrow A.

The bicycle 100 of FIG. 1 includes a brake system 120. In the illustrated embodiment, the brake system 120 includes a first brake lever assembly 122 and/or a second brake lever assembly (not shown). The first brake lever assembly 122 and/or the second brake lever assembly are disposed on the handlebars 104. The first brake lever assembly 122 may include a control device for the bicycle 100. As such, the first brake lever assembly 122 is coupled, such as by hydraulic or cable communication, to a brake force application device, such as a first brake caliper 124, via a first brake line 126. In the illustrated embodiment, the first brake caliper 124 is operatively coupled to the front wheel 108. The second brake lever assembly may be operatively coupled to a different brake force application device, such as a second brake caliper 128, via a second brake line 130. The second brake caliper 128 is operatively coupled to the rear wheel 110. In other embodiments, the hydraulic brake system 120 includes one or more additional and/or alternative components and/or is configured in other ways. For example, the hydraulic brake system 120 may include alternative and/or additional brake force application devices, such as rim brake calipers, which may be in communication with braking system control devices.

Figure 2:
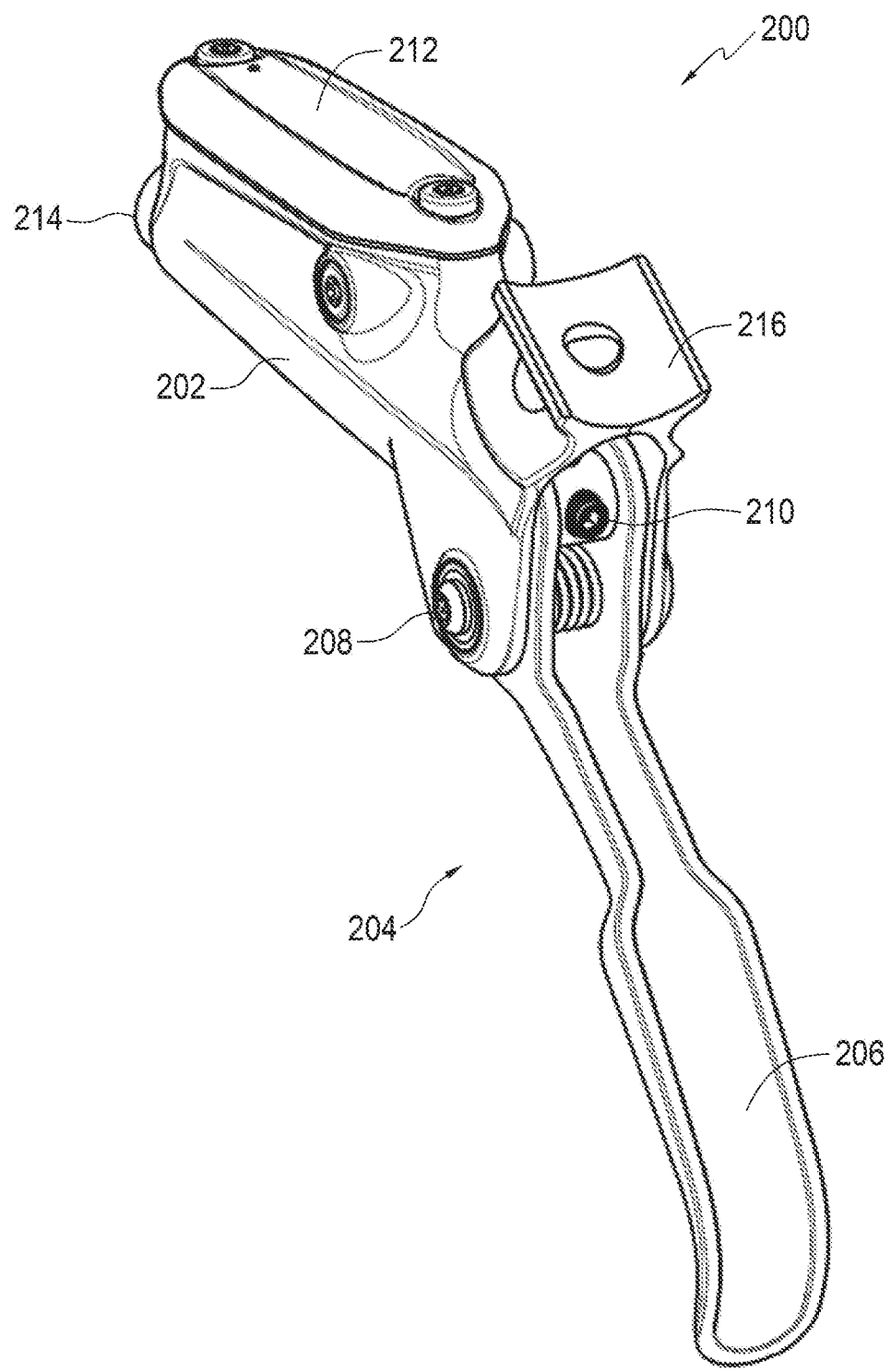
FIG. 2 is a perspective view of an embodiment of a braking control device, which may be implemented using the bicycle of FIG. 1.
Figure 3:
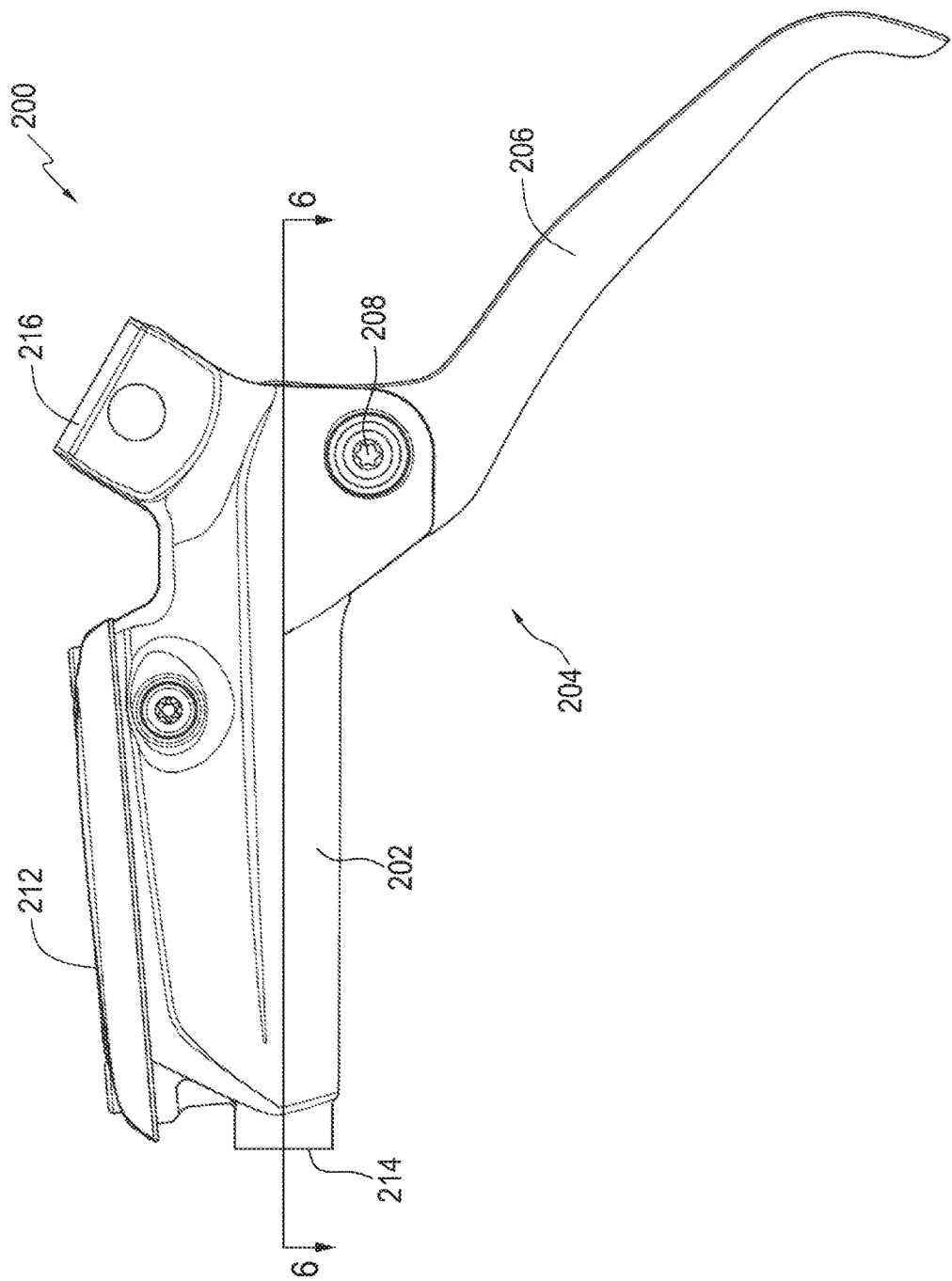
FIG. 3 is a top plan view of the braking control device of FIG. 2.
Figure 4:
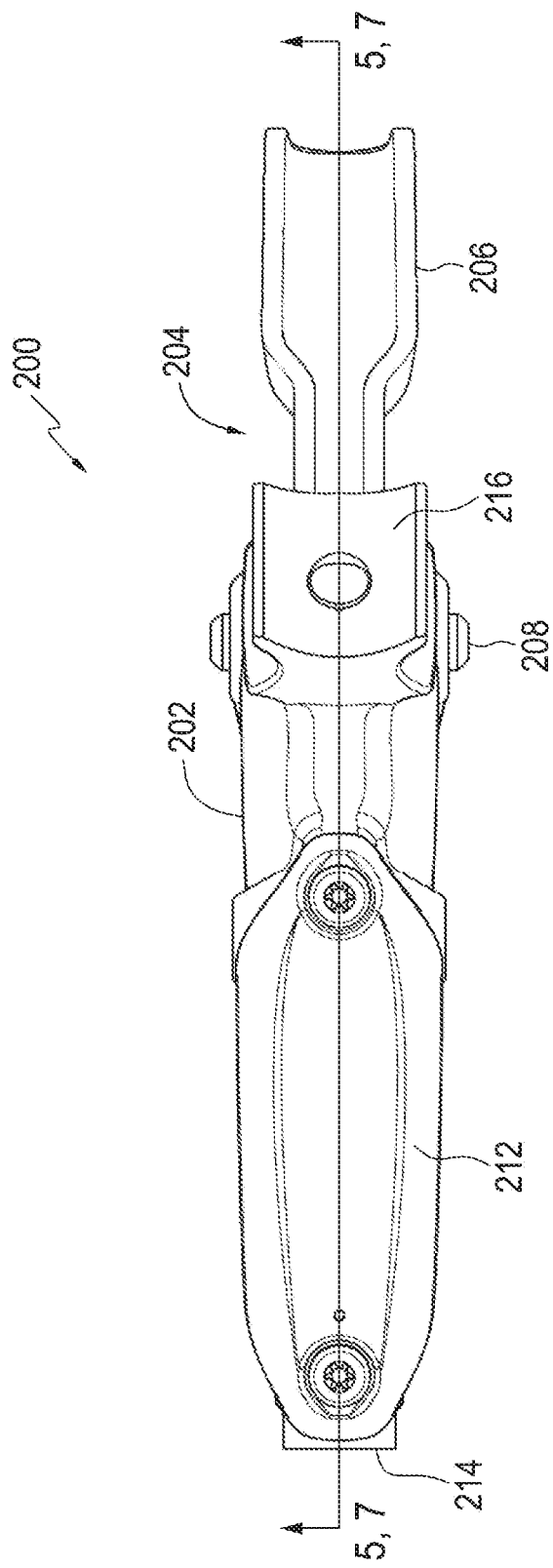
FIG. 4 is a side elevational view of the braking control device of FIGS. 2 and 3.

FIGS. 2-7 illustrate a bicycle hydraulic brake control device 200 in accordance with the teachings of this disclosure. The bicycle hydraulic control device 200 may be used to implement, for example, the brake system 120 of FIG. 1. With reference to FIGS. 2-4, the bicycle hydraulic brake control device 200 includes a housing 202 and a lever assembly 204. The lever assembly 204 includes a lever 206 (e.g., a blade) pivotably attached to the housing 202 via a pin 208. The lever assembly 204 includes a rod assembly 210. The control device 200 also includes a reservoir cover 212, which covers a reservoir (discussed below in connection with FIG. 5) and a hydraulic output 214. A clamp device 216 or any suitable fastening means is attached to the housing 202 to couple the housing 202 to a handlebar of a bicycle (e.g., the bicycle of FIG. 1).

Figure 5:
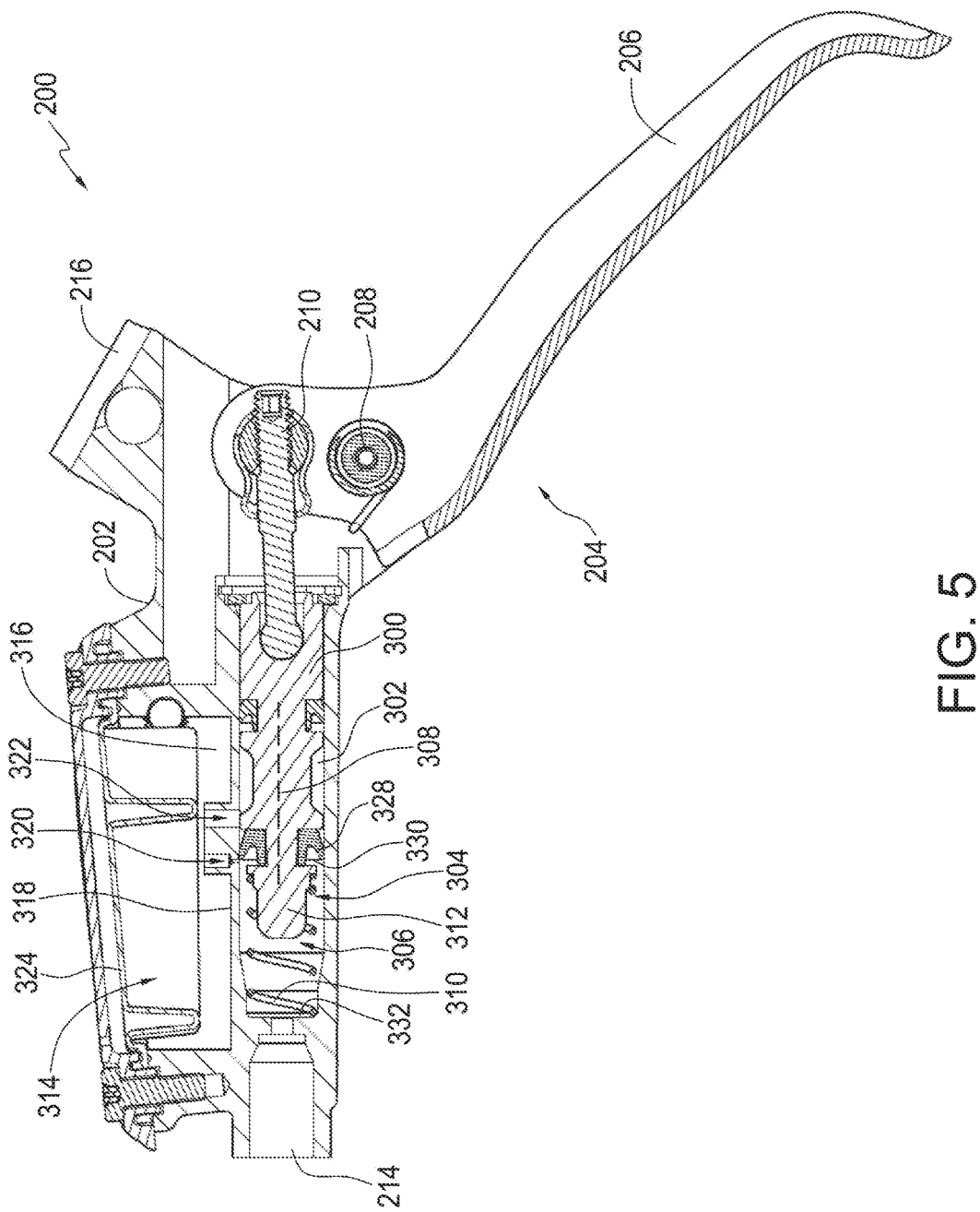
FIG. 5 is a cross-sectional view of the braking control device taken along the line 5-5 in FIG. 4.
Figure 6:
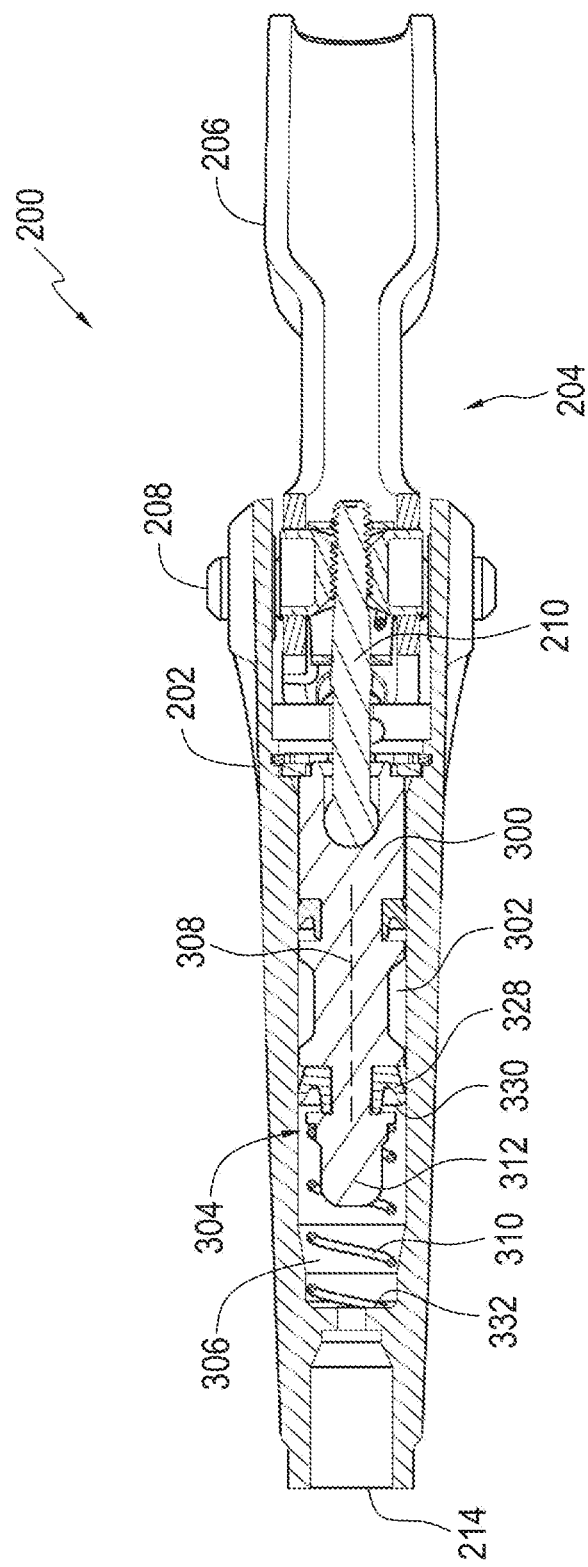
FIG. 6 is a cross-sectional view of the braking control device taken along the line 6-6 of FIG. 3.

FIGS. 5 and 6 illustrate cross-sectional views of the control device 200 of FIGS. 2-4. FIG. 5 is a cross-sectional view of the control device 200 along line 5-5 of FIG. 4. FIG. 6 is a cross-sectional view of the control device 200 along line 6-6 of FIG. 3. With reference to FIG. 5, the housing 202 includes a master cylinder 300 having a bore 302. The master cylinder 300 is hydraulically connected to a slave cylinder (not shown). The slave cylinder drives a brake force application device, such as a hydraulic caliper (not shown), via a hydraulic line coupled to the hydraulic output 214.

The master cylinder 300 includes a piston assembly 304 reciprocally disposed within the bore 302. The bore 302 includes a fluid chamber 306. The fluid chamber 306 includes hydraulic fluid (e.g. brake fluid). The piston assembly 304 reciprocates along a piston or cylinder axis 308. The piston assembly 304 and, thus, the lever 206 are biased toward a rest or home position by a biasing element 310, which may be a spring, such as a coil spring. Thus, after actuation of the lever 206, the biasing element 310 may bias or urge the lever 206 to the rest or home position. The piston assembly 304 may be a single-piece. In some embodiments, a piston 312 may be a separate part of the piston assembly 304. Alternatively, the piston 312 may be formed as a single-piece construction with a cap member (not shown).

The housing 202 includes a reservoir 314. The reservoir 314 includes a reservoir chamber 316 in communication with the fluid chamber 306. A bore wall 318 separates a portion of the reservoir 314, and thus, the reservoir chamber 316 from the bore 302. At least one timing port 320 and a compensation port 322 extend through the bore wall 318. A diaphragm or seal 324 covers the reservoir chamber 316.

Referring to FIGS. 5 and 6, pivoting the lever 206 from the rest position causes the piston assembly 304 to move the piston 312. As the piston 312 moves, a leading seal 328 (e.g., a cup or umbrella seal), covers the timing ports 320 to pressurize the fluid within the hydraulic output 214 to actuate a slave cylinder within a brake force application device, such as a brake caliper (not shown). When the lever 206 is released, the biasing element 310 urges the piston 312 toward a first end 330 of the fluid chamber 306 (e.g., toward the lever 206) and away from a second end 332 of the fluid chamber 306 until the piston 312 resumes the rest or home position.

Figure 7:
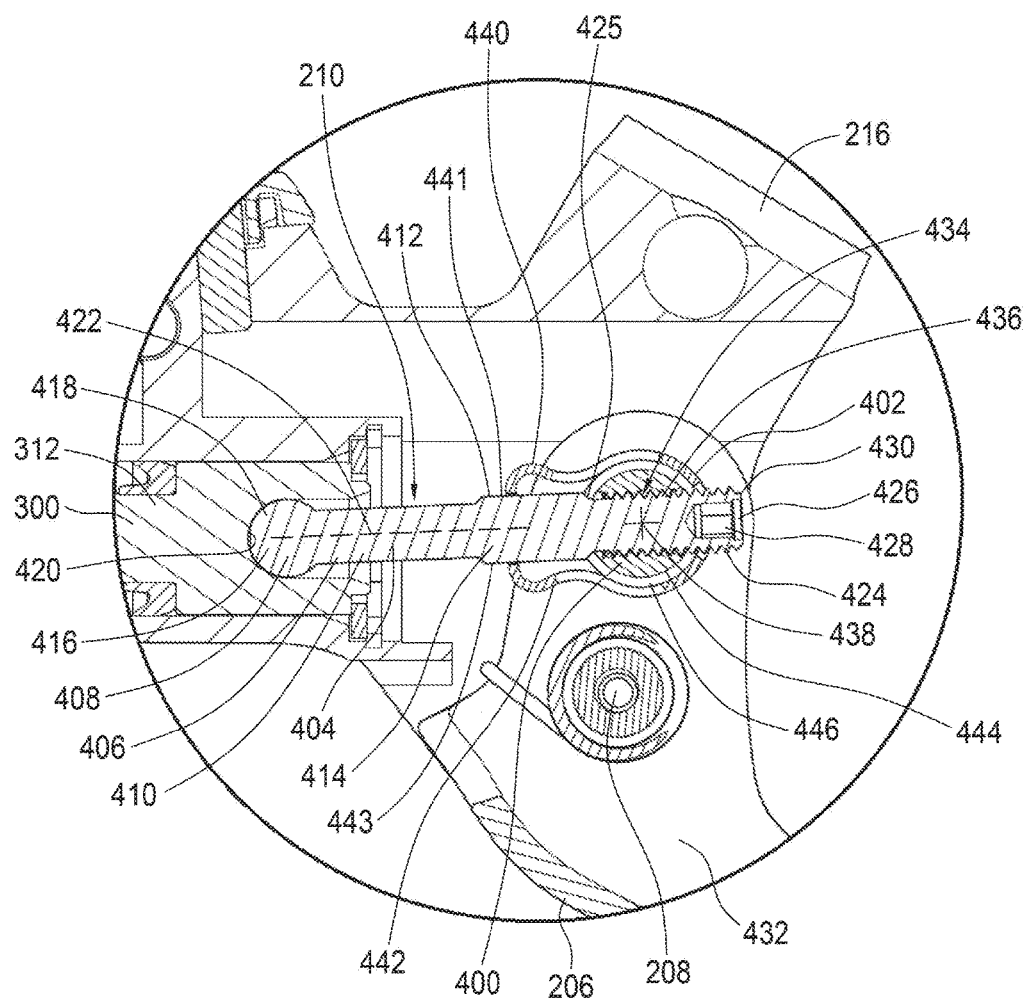
FIG. 7 is an enlarged cross-sectional view taken along the line 7-7 of FIG. 4 of a portion of the braking control device of FIGS. 2-6.

FIG. 7 is a cross-sectional view of the lever assembly 204 taken along line 7-7 of FIG. 4 illustrating the rod assembly 210. The rod assembly 210 operatively couples the lever 206 to the piston 312. The rod assembly 210 of FIG. 7 includes anchoring member, such as a pin or dowel 400, a retaining device, such as a clip 402, and a rod 404. In the illustrated embodiment, the rod 404 is a pushrod 406. The pushrod 406 includes a head 408, a first neck 410, a mating section or catch 412 (see also FIG. 8), and a second neck 414.

The mating section is shaped to matingly engage the retaining device as described herein. For example, surfaces of the mating section may be shaped to mate with corresponding surfaces of the retention device as is described with respect to FIGS. 10-12, or in other ways. Also, in an embodiment, the mating section may be a portion or section of a knob coupled with, or rotatably affixed to, the rod. A knob rotatably affixed to a rod is described with respect to FIGS. 15-18. The mating section may include multiple surfaces, each corresponding to different adjustment positions when mated with various corresponding surfaces of the retention device. As such, rotation of the rod such that different surfaces of the mating section are engaged with the retention device may provide different positions of adjustment. Further, with the mating section integrated with, or rotatably affixed to, the rod the different positions of adjustment may be indexed, or predetermined, positions of adjustment for the rod, and consequently a lever coupled with the rod.

The head 408 of FIG. 7 is a ball 416 defining a first or distal end 418 of the pushrod 406. The ball 416 of the pushrod 406 is received in a socket 420 of the piston 312 to operatively couple the pushrod 406 to the piston 312. The first neck 410 extends from the head 408 to the catch 412. As described in greater detail below, the clip 402 engages the catch 412 to obstruct and/or bias the pushrod 406 against rotation about a longitudinal axis 422 of the pushrod 406. The second neck 414 of the pushrod 406 of FIG. 7 includes the catch 412 and external or male threads 424 to threadably couple the pushrod 406 to the dowel 400. In the illustrated embodiment, the male threads 424 extend along less than an entire length of the second neck 414. In other embodiments, the male threads 424 extend along less, or more, or all of the length of the second neck 414.

The retention device, or clip 402 as is shown in this embodiment, is disposed or wrapped around a portion of the dowel 400 to couple the clip 402 to the dowel 400. As is shown, the coupling is such that the configuration of the dowel 400 and the clip 402 inhibits rotation relative to each other about an axis of rotation 438 of the dowel. This non-rotatable coupling allows the clip 402 to remain stationary while the rod 404 is rotated about the respective rod longitudinal axis 422. In some embodiments, the clip 402 is disposed or wrapped around more than about 180 degrees of the dowel 400 to reduce and/or prevent shuttling or vibration of the clip 402 during operation of the lever assembly 204. In the illustrated embodiment, the catch 412 of pushrod 406 includes a chamfered edge 425 between the catch 412 and the male threads 424 to facilitate assembly of the clip 402 and the pushrod 406 (e.g., to prevent binding of the clip 402 when coupled to the pushrod 406). In some embodiments, the clip 402 has a chamfered edge to facilitate assembly of the pushrod 406 and the clip 402.

With reference still to FIG. 7, a tool interface 426 enables a position of the pushrod 406 to be manipulated to adjust a throw and/or a reach of the lever 206. In the illustrated embodiment, the tool interface 426 is a hexagonal socket 428 dimensioned to receive a tool (e.g., a hex key). Further, the hexagonal socket 428 is accessible via a socket or proximal end 430 of the pushrod 406. In other embodiments, the tool interface 426 has other configurations. For example, the tool interface 426 may be a knob, a hexagonal head, a slot to receive a flathead screwdriver, and/or one or more additional and/or alternative configurations.

The anchoring member, or dowel 400 as is shown in this embodiment, is pivotably coupled to a butt 432 of the lever 206. The dowel 400 includes a bore 434 having internal or female threads 436. In the illustrated embodiment, the bore 434 is oriented substantially perpendicular to an axis of rotation 438 of the dowel 400. In other embodiments, the bore 434 has other orientations. In the illustrated embodiment, the pushrod 406 is threadably coupled to the dowel 400. For example, a portion of the second neck 414 is received in the bore 434 of the dowel 400, and the male threads 424 on the second neck 414 engage the female threads 436 of the bore 434 of the dowel 400. As a result, the pushrod 406 is rotatably coupled to the dowel 400 about the longitudinal axis 422 of the pushrod 406 and operatively coupled to the dowel 400 such that when the dowel 400 pivots with the lever 206, the pushrod 406 pivots with the dowel 400.

Still referring to FIG. 7, the clip 402 has a first extension, such as a first prong 440, and a second extension, such as a second prong 442. In the illustrated embodiment, the first prong 440 is disposed on a first side 441 of the pushrod 406, and the second prong 442 is disposed on a second side 443 of the pushrod 406 opposite the first side 441. The first prong 440 and the second prong 442 are biased toward each other and, thus, the first prong 440 and the second prong 442 are biased toward a longitudinal axis 422 of the pushrod 406. As a result, the first prong 440 and the second prong 442 secure the clip 402 to the pushrod 406 with a clamping force. In the illustrated embodiment, the clip 402 is disposed or wrapped around a portion of a periphery 444 of the dowel 400, and the first prong 440 and the second prong 442 extend in a direction along the longitudinal axis 422 of the pushrod 406 to engage the catch 412 of the pushrod 406 and secure the clip 402 to the pushrod 406. In the illustrated embodiment, a bushing 446 is disposed between the clip 402 and the dowel 400 to reduce vibrations of the clip 402. In other embodiments, the rod assembly 210 does not include the bushing 446.

Figure 8:
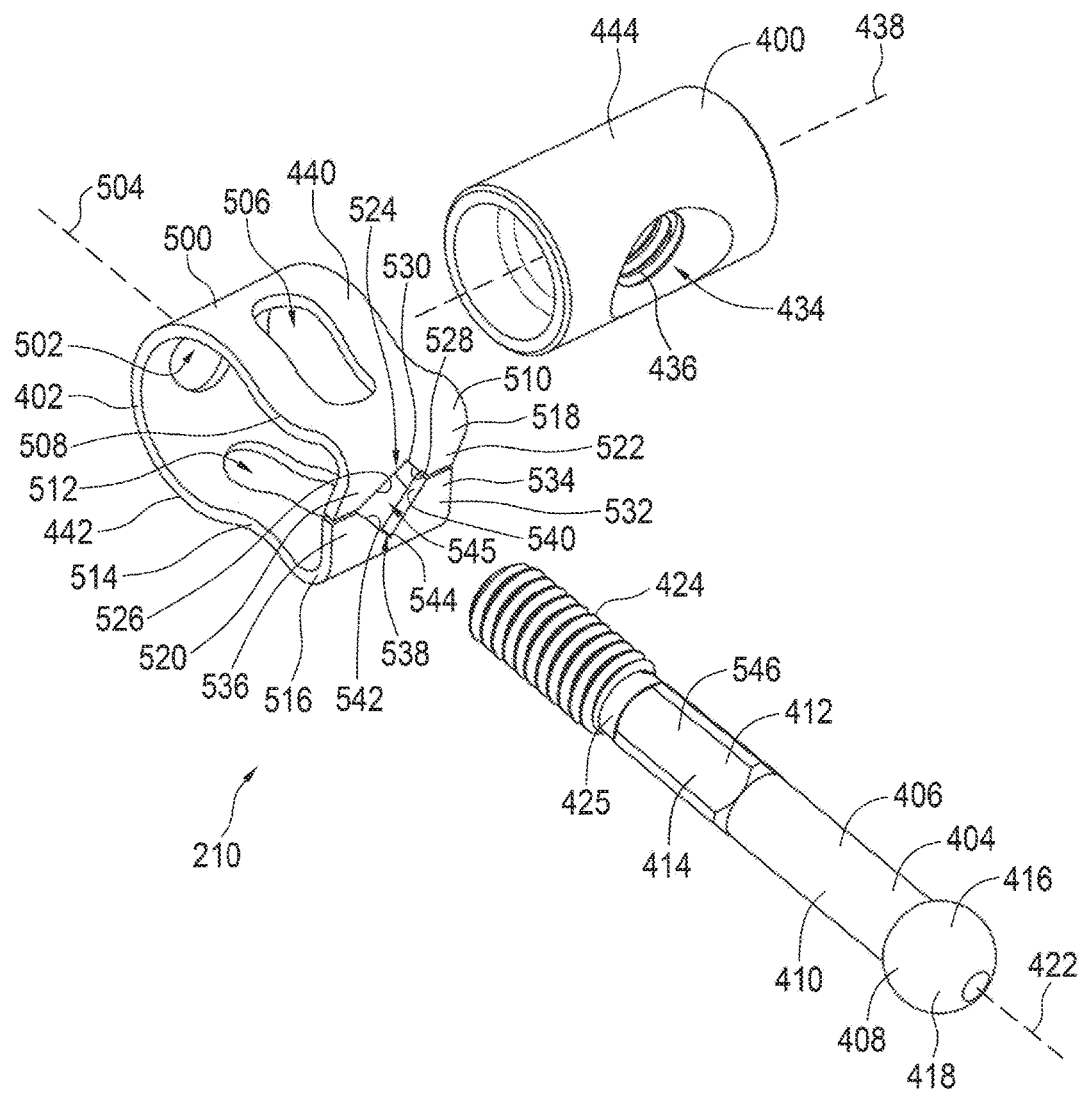
FIG. 8 is an exploded perspective view of a rod assembly of the braking device of FIGS. 2-7.

FIG. 8 is an exploded, perspective view of the rod assembly 210. In the illustrated embodiment, the clip 402 includes a base 500 from which the first prong 440 and the second prong 442 extend. The base 500, the first prong 440, and the second prong 442 cooperate to wrap around the portion of the periphery 444 of the dowel 400. In the illustrated embodiment, the base 500, the first prong 440, and the second prong 442 are integral or unitary, forming a single piece. In other embodiments, the first prong 440 and/or the second prong 442 are coupled to the base 500. The base 500 includes an aperture or passage 502 disposed along a central, longitudinal axis 504 of the clip 402. In some embodiments, a portion of the second neck 414 of the pushrod 406 extends through the passage 502. In the illustrated embodiment, the passage 502 enables a position of the pushrod 406 to be adjusted relative to the dowel 400 and the clip 402 in a direction along the longitudinal axis 422 of the pushrod 406.

Figure 10:
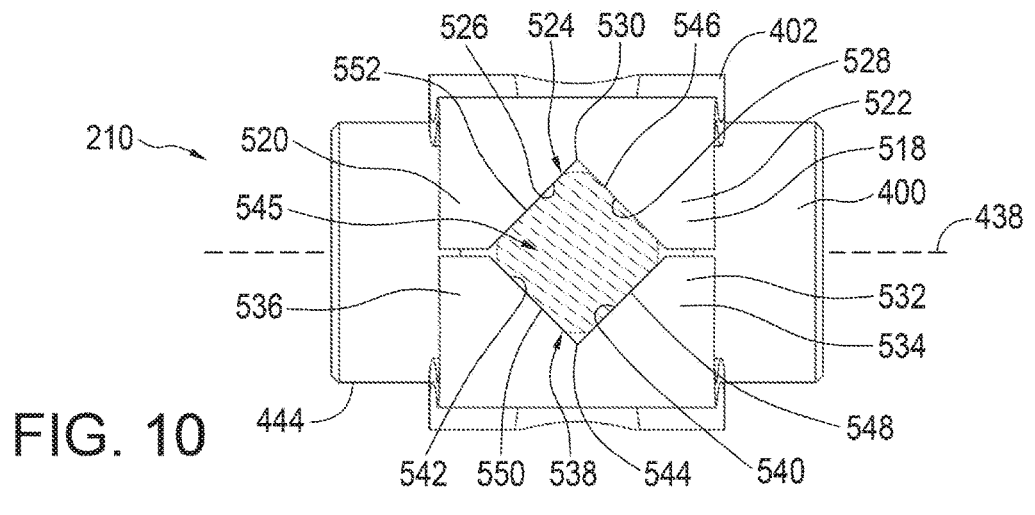
FIG. 10 is a cross-sectional, front elevational view of the rod assembly of FIGS. 8 and 9 taken along the line 10-10 of FIG. 9 illustrating the rod in a first locked position.

The first prong 440 of FIG. 8 has a first spring rate and applies a first spring force to the catch 412 of the pushrod 406 when the pushrod 406 is in a locked position (as, for example, shown in FIG. 10). In the embodiment of FIG. 8, the first prong 440 has a first size and a first shape that enables the first prong 440 to have the first spring rate and to apply the first spring force to the catch 412 of the pushrod 406 when the pushrod 406 is in a locked position. For example, in the illustrated embodiment, the first prong 440 includes a first aperture 506 disposed along the first prong 440. The first aperture 506 of FIG. 8 is generally oval. The first prong 440 also has a first point of inflection 508 and a second point of inflection 510. A shape and/or a size of the first aperture 506, a number of points of inflection of the first prong 440, a curvature of the first prong 440, and/or other aspects of the shape and the size of the first prong 440 (e.g., thickness or length), as well as material choice, affect a spring rate of the first prong 440 and a spring force applied by the first prong 440 to the catch 412 of the pushrod 406. For example, the first prong 440 with the first aperture 506 has a lesser spring rate and applies a lesser force to the catch 412 than the first prong 440 without the first aperture 506. Therefore, a shape and/or a size of the first prong 440 (e.g., a shape and/or a size of the first aperture 506) may be different in other embodiments to enable the first prong 440 to have other spring rates and/or apply other forces to the catch 412. The first aperture 506 also reduces a weight of the clip 402 relative to the clip 402 without the first aperture 506.

The second extension or prong 442 of FIG. 8 has a second spring rate and applies a second spring force to the catch 412 of the pushrod 406 when the pushrod 406 is in the locked position. In the illustrated embodiment, the second prong 442 has a second size and a second shape that enables the second prong 442 to have the second spring rate and to apply the second spring force to the catch 412 of the pushrod 406. For example, in the illustrated embodiment, the second prong 442 includes a second aperture 512. The second aperture 512 is located within the second prong 442 and is generally oval. The second prong 442 also has a third point of inflection 514 and a fourth point of inflection 516. A shape and/or a size of the second aperture 512, a number of points of inflection of the second prong 442, a curvature of the second prong 442, and/or other aspects of the shape and the size of the second prong 442 (e.g., thickness or length), as well as material choice, affect a spring rate of the second prong 442 and a spring force applied by the second prong 442 to the catch 412 of the pushrod 406. For example, the second prong 442 with the second aperture 512 has a lesser spring rate and applies a lesser force to the catch 412 than the second prong 442 without the second aperture 512. Therefore, a shape and/or a size of the second prong 442 (e.g., a shape and/or a size of the second aperture 512) may be different in other embodiments to enable the second prong 442 to have other spring rates and/or apply other forces to the catch 412. Further, the second aperture 512 reduces a weight of the clip 402 relative to the clip 402 without the second aperture 512. In an embodiment, the first spring force and the second spring force are equal.

As indicated above, material selection may also be a component of the force determination for the retention device. Any material operable to provide the mating connection to the rod may be used for the retention device, or clip 402. In an embodiment, the retention device may be formed of plate or sheet steel, such as is commonly referred to as spring steel. For example, the retention device may be formed of various Society of Automotive Engineers ("SAE") grades 1074, 1075, 1080, 1095, 5160, 9255, 301 spring tempered stainless steel, other metallic materials, or combinations thereof. In another example, the retention device may be formed of plastic, polymerized, or plasticized materials, such as polyoxymethylene ("POM"). In an embodiment, various components of the retention device may be formed of different materials. For example, the base may be made from one material, a first extension may be made from another material, and a second extension may be made of yet another material. Further, each component of the retention device may be formed of multiple materials.

In the illustrated embodiment, the second prong 442 is a mirror image of the first prong 440 and, thus, the second spring rate and the second spring force are substantially equal to the first spring rate and the first spring force, given an equal or symmetric geometry of a corollary matting section providing the deflection of the prongs 440, 442. In other embodiments, the first prong 440 and the second prong 442 have different spring rates and/or apply different spring forces to the catch.

Figure 9:
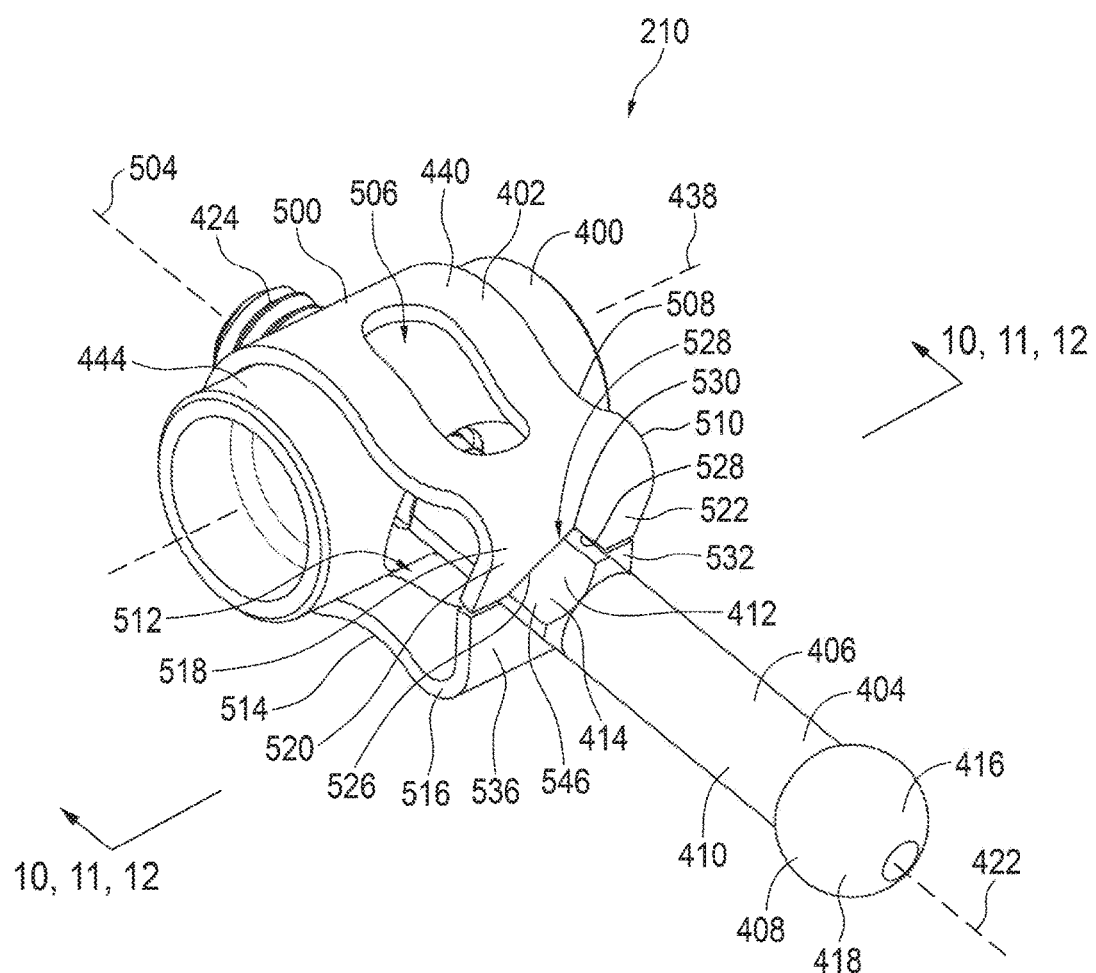
FIG. 9 is a perspective view of the rod assembly of the braking device of FIGS. 2-8.

The first prong 440 of FIGS. 8 and 9 includes a first end portion, which may be a jaw 518. In the illustrated embodiment, the first jaw 518 includes a first tooth 520 and a second tooth 522 defining a first notch 524 between the first tooth 520 and the second tooth 522. The first notch 524 is V-shaped and, thus, includes a first edge 526 and a second edge 528 intersecting at a point 530. In the illustrated embodiment, the first tooth 520 and the second tooth 522 extend toward the second prong 442 (e.g., downward in the orientation of FIG. 8).

The second prong 442 includes a second end portion, which may be a jaw 532. The second jaw 532 includes a third tooth 534 and a fourth tooth 536 defining a second notch 538 between the third tooth 534 and the fourth tooth 536. The second notch 538 is V-shaped and, thus, includes a third edge 540 and a fourth edge 542. The third edge 540 and the fourth edge 542 intersect at a second point 544. When the first jaw 518 and the second jaw 532 engage the pushrod 406 in the locked position, the first notch 524 and the second notch 538 form a substantially rectangular (e.g., square) aperture 545 through which the pushrod 406 extends. Thus, the pushrod 406 extends through the passage 502 and the aperture 545 of the clip 402. In other embodiments, the first jaw 518 and the second jaw 528 have notches of other shapes, sizes, and/or configurations through which the pushrod 406 extends. In some embodiments, the first jaw 518 and the second jaw 532 do not have notches. For example, the first jaw 518 and the second jaw 532 may have substantially uninterrupted, planar surfaces, or lips, that engage the catch 412, and/or one or more additional and/or alternative features and/or components to engage the pushrod 406. In some embodiments, the first jaw 518 and the second jaw 532 have protrusions or teeth that are received in depressions or slots in the catch 412 when the jaws 518, 532 engage the catch 412.

Figure 11:
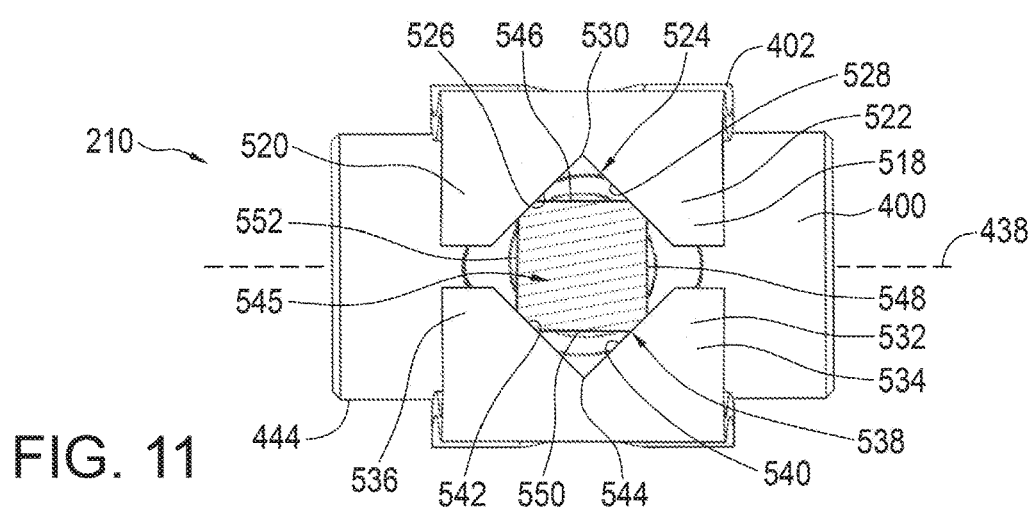
FIG. 11 is a cross-sectional, front elevational view of the rod assembly of FIGS. 8 and 9 taken along the line 11-11 of FIG. 9 illustrating the rod in an unlocked position.
Figure 12:
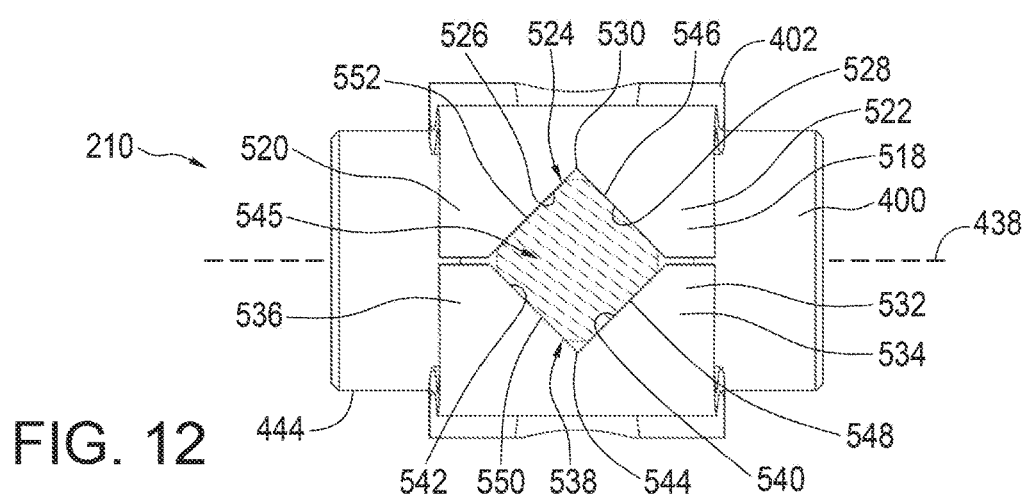
FIG. 12 is a cross-sectional, front elevational view of the rod assembly of FIGS. 8 and 9 taken along the line 12-12 of FIG. 9 illustrating the rod in a second locked position.

With respect to FIGS. 10-12, the mating section or catch 412 may have a first flat surface 546, a second flat surface 548 (FIGS. 10-12), a third flat surface 550 (FIGS. 10-12), and/or a fourth flat surface 552 (FIGS. 10-12) (collectively "flat surfaces 546, 548, 550, 552"). In the illustrated embodiment, the catch 412 is a rectangular prism having chamfered, longitudinal edges. Thus, in the illustrated embodiment, the shape of the catch 412 substantially corresponds to the shape of the aperture 545 defined by the jaws 518, 532. In other embodiments, the catch 412 is other shapes such as, for example, a rectangular prism without chamfered, longitudinal edges, a hexagonal prism, an octagonal prism, and/or any other shape that cooperates with the clip 402 to obstruct and/or bias the pushrod 406 against rotation about the longitudinal axis 422 of the pushrod 406.

Still referring to FIGS. 10-12, during operation of the lever assembly 204 (e.g., while a rider is riding a bicycle employing the lever assembly 204) the first edge 526 and the second edge 528 of the first jaw 518 of the first prong 440 may engage the first flat surface 546 and the second flat surface 548, respectively. The third edge 540 and the fourth edge 542 of the second jaw 532 of the second prong 442 engage the third flat surface 550 and the fourth flat surface 552, respectively. As a result, when the pushrod 406 is engaged by the clip 402, the first jaw 518 and the second jaw 532 of the clip 402 obstruct rotation of the pushrod 406 about the longitudinal axis 422 of the pushrod 406 relative to the clip 402 and/or apply a spring force biasing the pushrod 406 against rotation about the longitudinal axis 422 of the pushrod 406. For example, if a rotational force is applied to the pushrod 406 during operation of the lever assembly 204, the pushrod 406 contacts and/or applies rotational force to the clip 402. The clip 402 is wrapped around the portion of the periphery 444 of the dowel 400 such that the clip 402 is non-rotatably coupled to the dowel 400. As a result, when the pushrod 406 contacts and/or applies rotational force to the clip 402 about the longitudinal axis 422 of the pushrod 406, the clip 402 resists, reduces, and/or prevents rotation of the pushrod 406 about the longitudinal axis 422 of the pushrod 406 via the spring forces applied by the first prong 440 and/or the second prong 422 to the pushrod 406. Thus, when the edges 526, 528, 540, 542 engage the flat surfaces 546, 548, 550, 552, the pushrod is in a fixed or locked position.

FIG. 10 is a cross-sectional view of the rod assembly 210 along line 10-10 of FIG. 9 illustrating the pushrod 406 is in a first locked position and a first longitudinal position. When the pushrod 406 is in the first locked position, the first flat surface 546 is engaged with the first edge 526; the second flat surface 548 is engaged with the second edge 528; the third flat surface 550 is engaged with the third edge 540; and the fourth flat surface 552 is engaged with the fourth edge 542. When the pushrod 406 is in the first longitudinal position, the lever 206 has a first reach.

A rider or technician may adjust a reach of the lever assembly 204 by adjusting a longitudinal position of the pushrod 406 (i.e., a position of the pushrod 406 along the longitudinal axis 422 of the pushrod 406). To adjust the longitudinal position of the pushrod 406, the rider or technician may insert a tool (e.g., a hex key) into the tool interface 426 and rotate the pushrod 406 via the tool. When the pushrod 406 rotates via the tool, the male threads 424 of the second neck 414 slide along the female threads 436 of the dowel 400 to move the pushrod 406 toward or away from the piston 312 depending on a direction of rotation of the pushrod 406 (e.g., toward when rotated clockwise or away when rotated counterclockwise). Thus, although the clip 402 applies force to the pushrod 406 that obstructs and/or biases the pushrod 406 against rotation during operation of a bicycle employing the lever assembly 204 (e.g., the bicycle 100 of FIG. 1), the rider or technician may overcome the spring force of the clip 402 to rotate the pushrod 406 to adjust the longitudinal position of the pushrod 406 and, thus, the reach of the lever assembly 204.

FIG. 11 illustrates the rod assembly of FIG. 10 when the pushrod 406 rotates out of the first locked position by about forty-five degrees. When the pushrod 406 rotates to adjust the longitudinal position of the pushrod 406, the edges 526, 528 ride along the catch 412. As a result, the flat surfaces 546, 548, 550, 552 of the catch 412 drive the prongs 440, 442 apart and disengage the jaws 518, 532 from the flat surfaces 546, 548, 550, 552.

In FIG. 12, the pushrod 406 is in a second locked position and a second longitudinal position in which the pushrod 406 is oriented about ninety degrees from the first locked position. When the pushrod 406 is in the second locked position, the first flat surface 546 is engaged with the second edge 528; the second flat surface 548 is engaged with the third edge 540; the third flat surface 550 is engaged with the fourth edge 542; and the fourth flat surface 552 is engaged with the first edge 526. As a result, the clip 402 locks the pushrod 406 in the second longitudinal position and, thus, the lever 206 in a second reach.

Thus, as illustrated in FIGS. 10-12, when the pushrod 406 includes four flat surfaces 546, 548, 550, 552, rotation of the pushrod 406 by ninety degrees indexes the pushrod 406 from the first locked position to the second locked position and adjusts a longitudinal position of the pushrod 406 from the first longitudinal position to the second longitudinal position. A linear distance between the first longitudinal position and the second longitudinal position corresponds to an angular distance between the first locked position and the second locked position. As a result, longitudinal positions of the pushrod 406 are set or indexed based on locked positions of the pushrod 406. For example, when the catch 412 has four flat surfaces, the pushrod 406 has four indexed longitudinal positions per rotation of the pushrod 406, which may be, for example, 0.5 millimeters apart. Thus, the rider or technician may adjust the reach of the lever 206 by 0.5 millimeters by rotating the pushrod 406 ninety degrees. In some embodiments, the clip 402 generates tactile and/or auditory feedback to the technician or rider to indicate to the technician or rider that the pushrod 206 is in a locked and/or indexed position.

A fineness or sensitivity of adjustment of longitudinal positions of the pushrod 406 corresponds to a number of locked positions per rotation of the pushrod 406. For example, in some embodiments in which the catch 412 has eight flat surfaces and, thus, eight indexed longitudinal positions per rotation of the pushrod 416, the indexed longitudinal positions of the pushrod 406 may be, for example, 0.25 millimeters apart.

Figure 13:
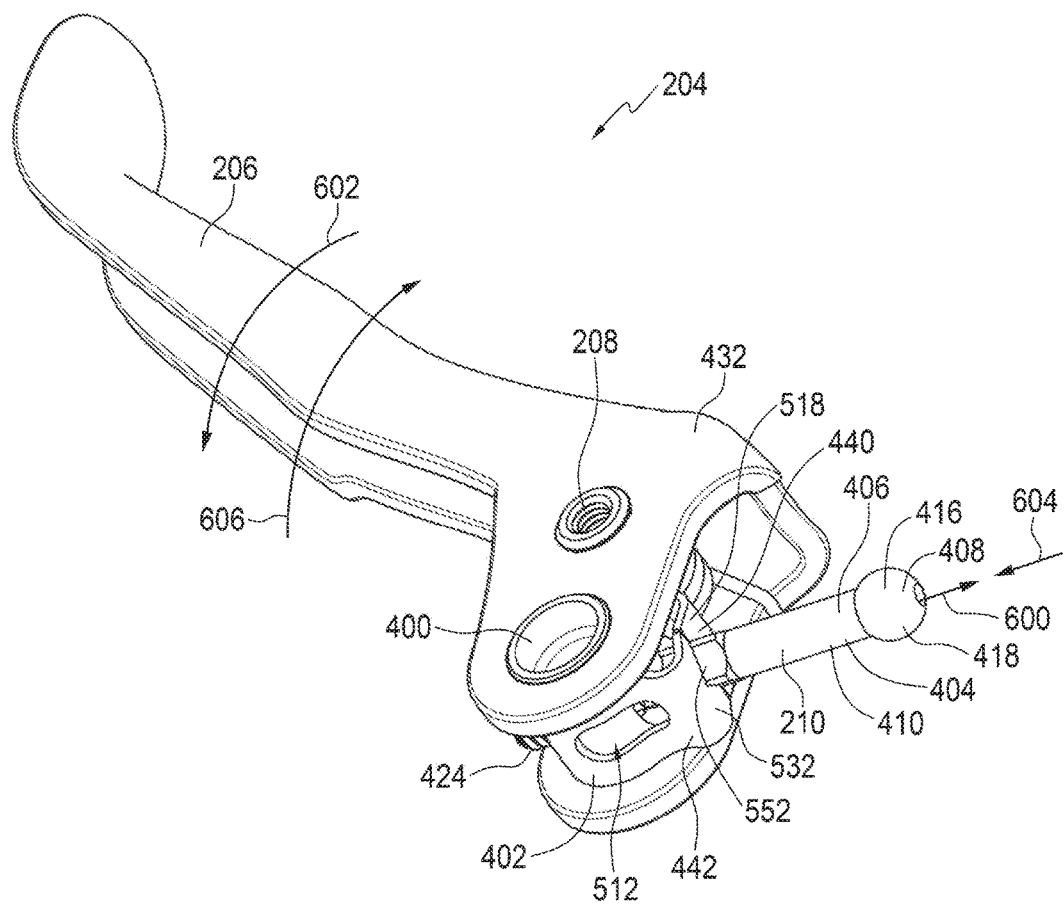
FIG. 13 is a perspective view of a lever assembly of the braking control device of FIGS. 2-7.

FIG. 13 is a perspective view of the rod assembly 210 and the lever 206. The housing 202 is not shown in FIG. 13 for clarity. When the longitudinal position of the pushrod 406 is adjusted in a direction of first arrow 600, the lever 206 moves in the direction of a second arrow 602 and, thus, increases the reach of the lever 206. When the longitudinal position of the pushrod 406 is adjusted in the direction of third arrow 604, the lever 206 moves in a direction of fourth arrow 606 and, thus, decreases the reach of the lever 206.

FIGS. 14-18 illustrate another hydraulic brake control device 700 in accordance with the teachings of this disclosure. The hydraulic brake control device 700 of FIGS. 14-18 includes a housing 702 and a lever assembly 704. The lever assembly 704 includes a lever 706 (e.g., a blade) pivotably coupled to the housing 702 via a pivot 708. In this embodiment, the lever assembly 704 includes a linkage 710 and a pushrod assembly 712. The pushrod assembly 712 enables a rider or technician to adjust a position of a piston assembly (described in further detail below) disposed within the housing 702. The control device 700 also includes a reservoir cover 714, which covers a reservoir (described in further detail below) and a hydraulic output 718.

The control device 700 further includes a rod assembly 716 coupled to the lever 706 and the linkage 710. As discussed below in connection with FIG. 15, the rod assembly 716 enables a rider or technician to adjust a reach of the lever 706. A clamp device 720 or any suitable fastening means may be part of or attached to the housing 702 to couple the housing 702 to a handlebar of a bicycle (e.g. the bicycle of FIG. 1).

Figure 14:
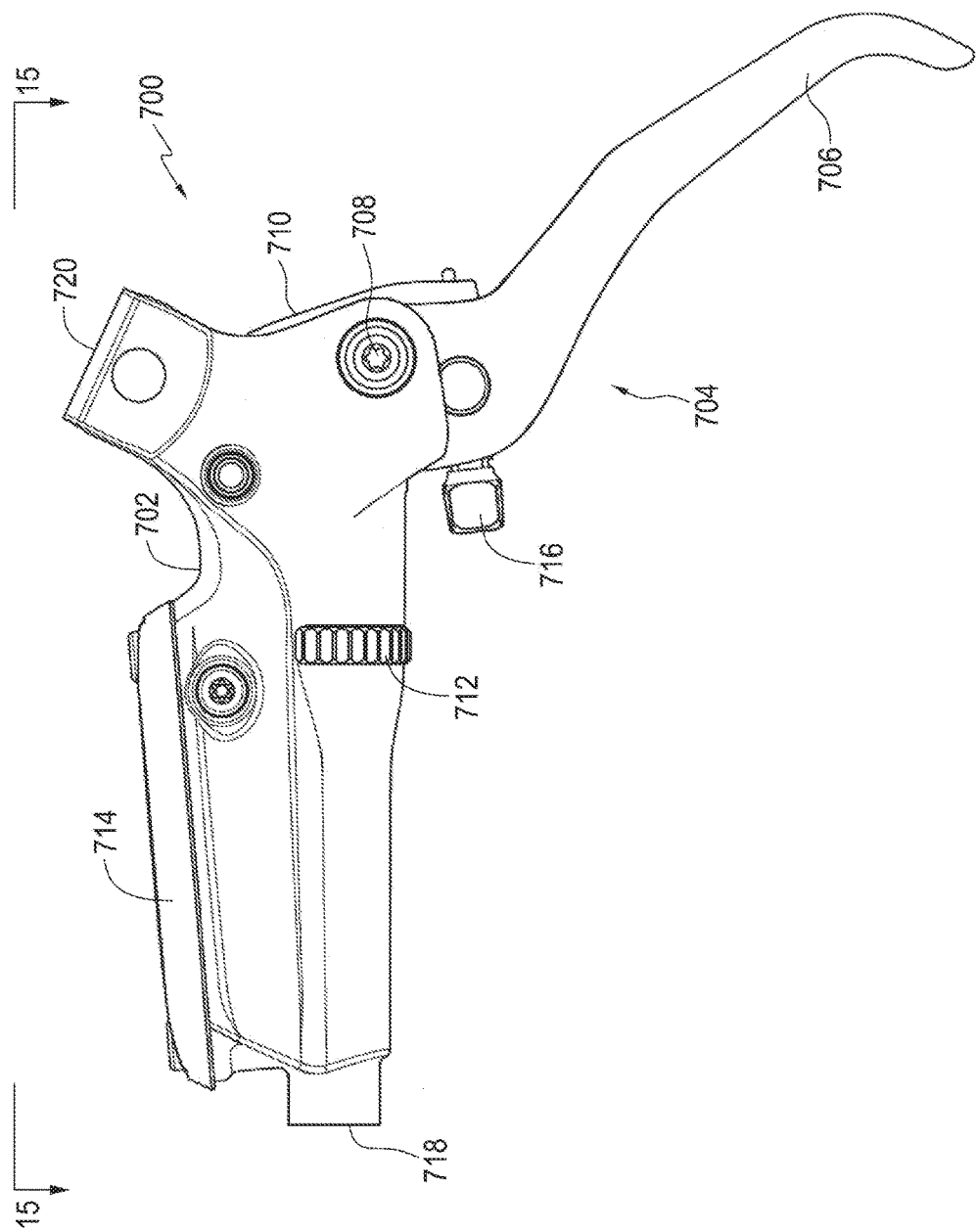
FIG. 14 is a top plan view of a braking control which may involve lever adjustment.
Figure 15:
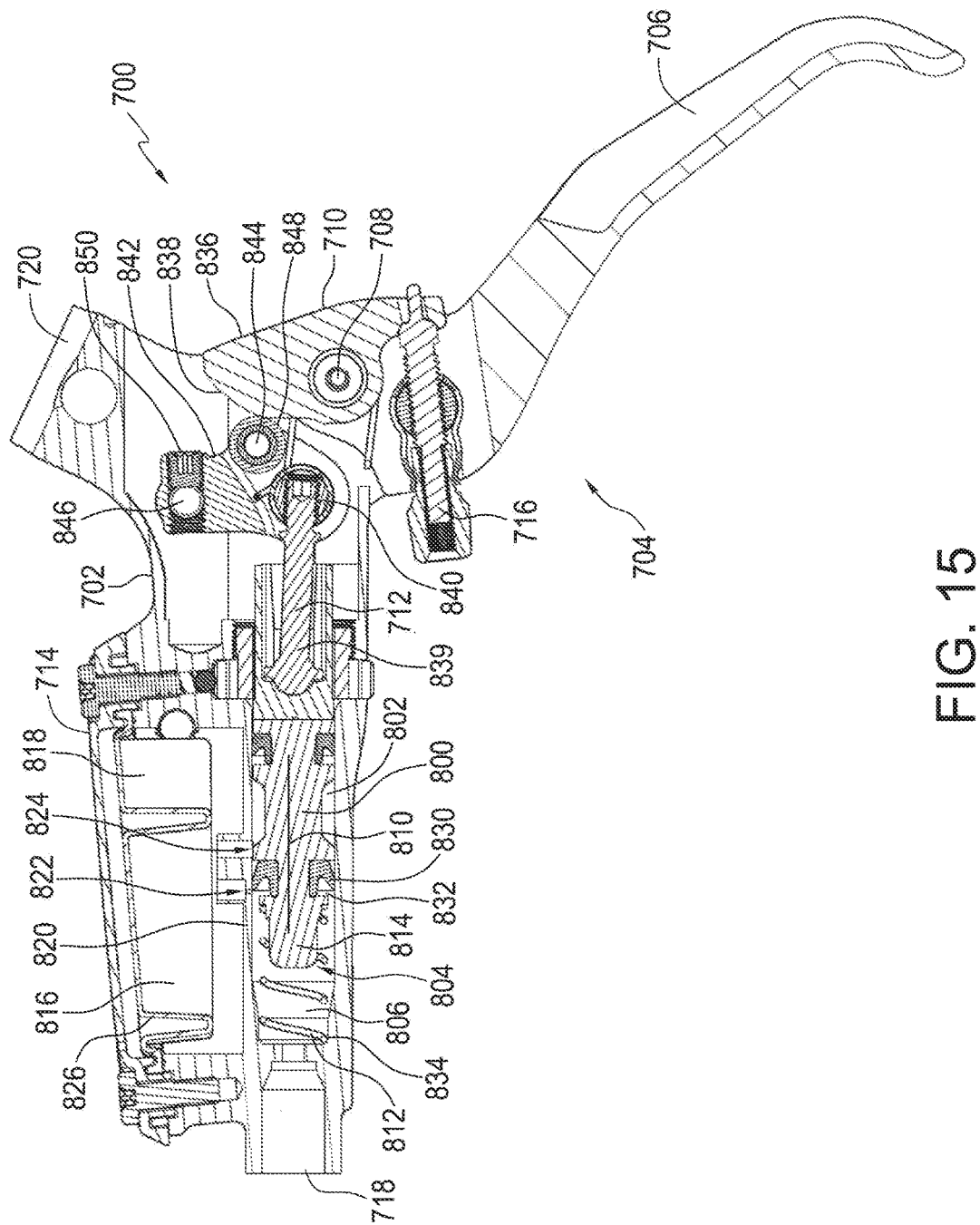
FIG. 15 is a cross-sectional view of the braking control device of FIG. 14 taken along the line 15-15 of FIG. 14, which is a similar sectional view to that shown in FIG. 5 taken along the line 5-5 of FIG. 4.

FIG. 15 illustrates a cross-sectional view of the control device 700 of FIG. 14. The housing 702 includes a master cylinder 800 that is hydraulically connected to a slave cylinder (not shown). The slave cylinder actuates a brake force application device, such as a hydraulic caliper (not shown), via a hydraulic line attached to the hydraulic output 718. The housing 702 also includes a bore 802. A piston assembly 804 is reciprocally disposed within the bore 802. Further, the bore 802 has a fluid chamber 806, which includes hydraulic fluid (e.g., a brake fluid).

The piston assembly 804 reciprocates along a piston or cylinder axis 810. The piston assembly 804 is biased toward a rest or home position via a biasing element 812, which may be a spring, such as a coil spring. The piston assembly 804 may be a single-piece or formed as multiple pieces. In some embodiments, a piston 814 may be a separate part of the piston assembly 804. Alternatively, the piston 814 may be formed as a single-piece construction with a cap member (not shown).

The housing 702 further includes a reservoir 816. The reservoir 816 includes a reservoir chamber 818 in communication with the fluid chamber 806. A bore wall 820 separates a portion of the bore 802 from the reservoir 816. Timing ports 822 and a compensating port 824 extend through the bore wall 820. A diaphragm or seal 826 covers the reservoir chamber 818.

Still referring to FIG. 15, pivoting the lever 706 from the rest position causes the piston assembly 804 to drive the piston 814. As the piston 814 moves, a leading seal 830 (e.g., a cup or umbrella seal) covers the timing ports 822 to pressurize the fluid within the hydraulic output 718 and actuate a slave cylinder within a hydraulically coupled brake force application device, such as a brake caliper (not shown). When the lever 706 is released, the biasing element 812 biases the piston 814 toward a first end 832 of the fluid chamber 806 and away from a second end 834 of the fluid chamber 806 until the piston 814 resumes the rest or home position.

The lever 706 (e.g., a blade) is pivotably coupled to the housing 702 of the hydraulic brake control device 700 via the first pivot 708. The linkage 710 is also pivotably coupled to the housing 702 via the first pivot 708. In the illustrated embodiment, the linkage 710 includes a link 836 having a cam-shaped surface 838. Further, the pushrod assembly 712 is pivotably coupled to the link 836. The pushrod assembly 712 includes a pushrod 839 and a dowel 840.

The linkage 710 also includes a follower 842. The follower 842 is pivotably coupled to the housing 702 via a second pivot 844. The follower 842 also includes a third pivot 846 and a roller 848. The roller 848 engages the cam surface 838 of the link 836. When the lever 706 moves, the follower 842 and the cam link 836 cooperate to move the piston assembly 804 along a path associated with a profile of the cam surface 838. In some embodiments, the follower 842 may be secured to the second pin 708 with a locknut 850.

Figure 16:
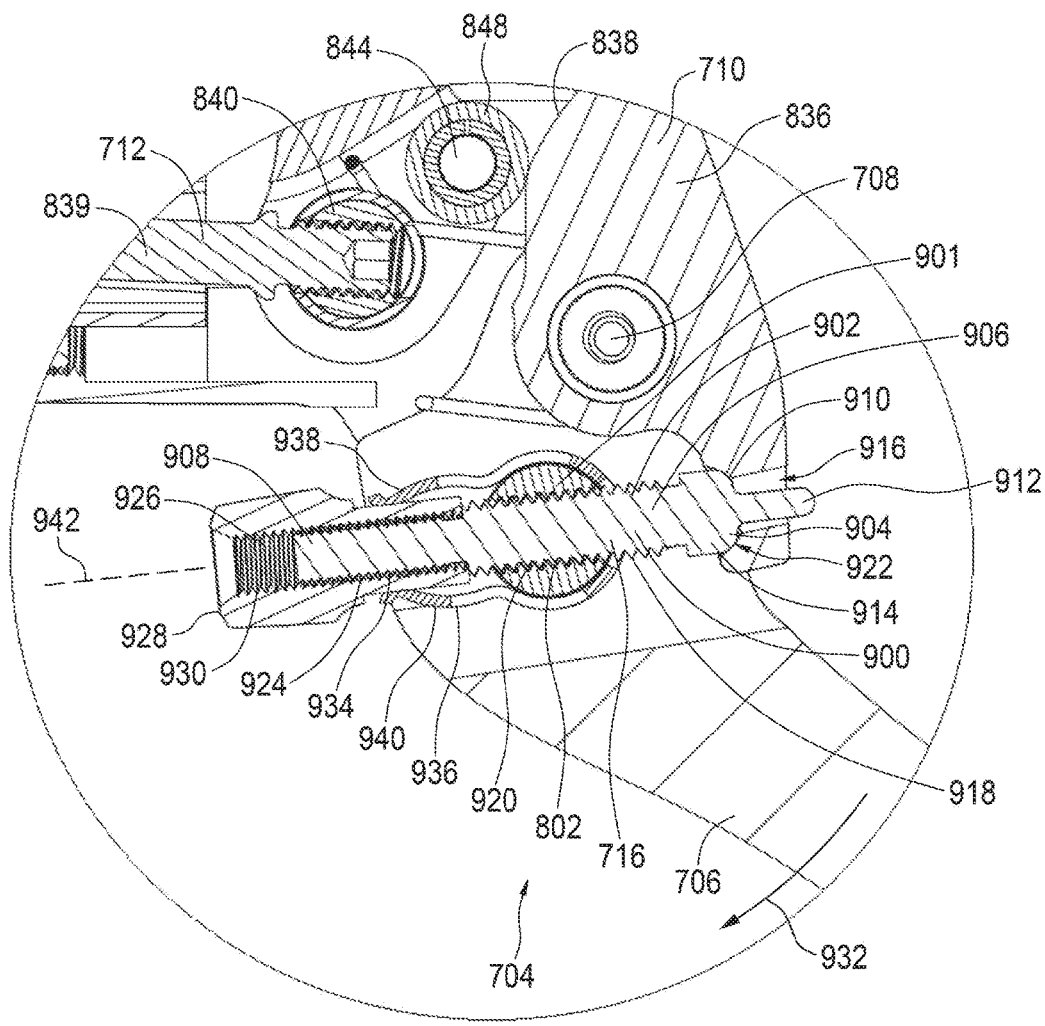
FIG. 16 is an enlarged cross-sectional view of a portion of the braking control device of FIG. 15.

Referring to FIG. 16, the rod assembly 716 is operatively coupled to the lever 706 and the linkage 710. The rod assembly 716 includes a rod 900 and a pin 901. In the illustrated embodiment, the rod 900 is a screw 902 including a head 904, a first section 906, and a second section 908. The head 904 is a ball 910 having a guide or protrusion 912. The head 910 also defines a first or distal end 914 of the screw 902. The ball 910 is pivotably coupled to a socket or receptacle 922 of the linkage 710, and the guide 912 extends from the ball 912 into an aperture 916 of the linkage 710. The first section 906 of the screw 902 includes first male threads 918 engaged with first female threads 920 of the bore 802 of the pin 901. The second section 908 of the screw 902 includes second male threads 924. The second section 908 of the screw 902 is received in a second bore 926 of a knob 928, and the second male threads 924 engage second female threads 930 of the knob 928.

To adjust a throw or reach of the lever 706 of the hydraulic brake control device 700, the knob 928 is rotated in a first direction (e.g., counterclockwise) or a second direction (e.g., clockwise). When the knob 928 rotates in the first direction, the rod 900 moves the lever 706 in a direction of arrow 932 and increases a reach of the lever 706. Thus, a rider or technician may adjust the reach of the lever assembly 704 by rotating the knob 928. When the knob 928 rotates in the second direction opposite the first direction, the rod 900 moves the lever 706 opposite the direction of the arrow 932 and decreases the reach of the lever 706.

In the illustrated embodiment, the knob 928 includes a mating section or catch 934. The rod assembly 716 of FIG. 16 includes a clip 936 having a first prong 938 and a second prong 940. The first prong 938 and the second prong 940 are biased toward each other and, thus, the first prong 938 and the second prong 940 are biased toward a longitudinal axis 942 of the screw 902. As a result, the first prong 938 and the second prong 940 clamp the clip 936 to the catch 934.

Figure 17:
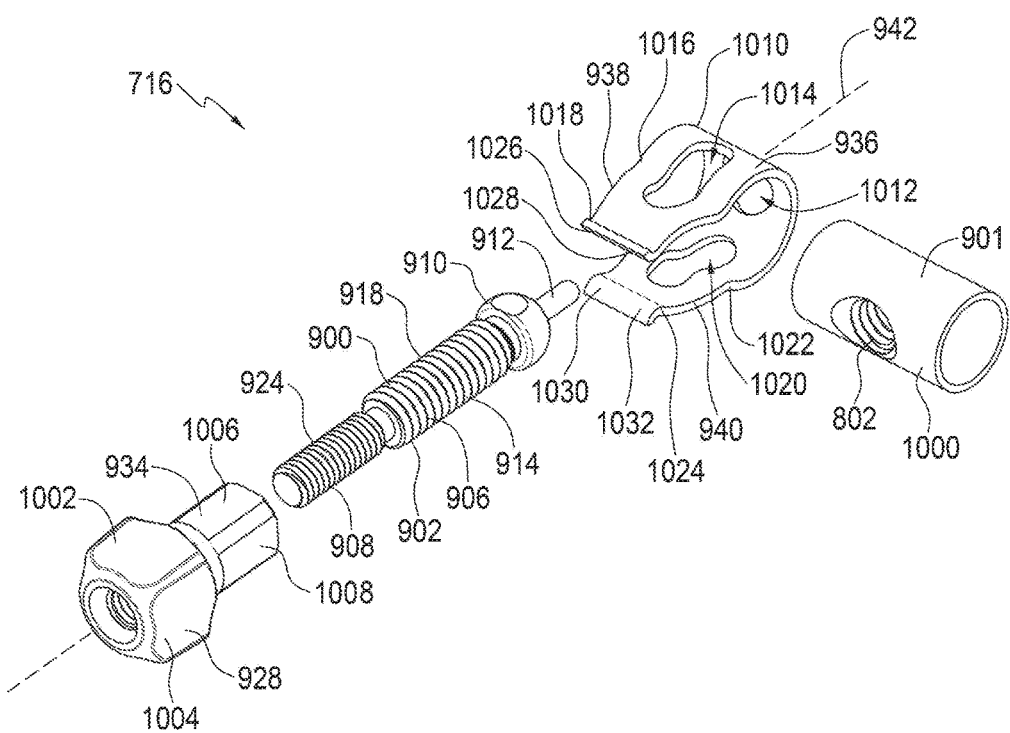
FIG. 17 is an exploded, perspective view the of an adjustable rod assembly of the braking control device of FIGS. 14-16.

FIG. 17 is an exploded, perspective view of the rod assembly 716. In the illustrated embodiment, the clip 936 is wrapped around a portion of a periphery 1000 of the pin 901 to non-rotatably couple the clip 936 to the pin 901 about the longitudinal axis 942. The first prong 938 and the second prong 940 extend in a direction along the longitudinal axis 942 of the screw 902 and engage the catch 934 of the knob 928 to secure the clip 936 to the knob 928. In some embodiments, a bushing (not shown) is disposed between the clip 936 and the pin 901 to reduce vibrations of the clip 936.

The knob 928 includes grip surfaces 1002, 1004, which may be curved, textured, and/or configured in one or more additional and/or alternative ways to facilitate gripping of the knob 928. The catch 934 includes a first flat surface 1006, a second flat surface 1008, a third flat surface (not shown), and a fourth flat surface (not shown) (collectively "flat surfaces 1006, 1008"). In the illustrated embodiment, the catch 934 is a rectangular prism having chamfered, longitudinal edges. Thus, the first flat surface 1006 is opposite the third flat surface 1006, and the fourth flat surface is opposite the second flat surface 1008. In other embodiments, the catch 934 comprises other shapes such as, for example, a rectangular prism without chamfered, longitudinal edges, a hexagonal prism, an octagonal prism, and/or any other shape that cooperates with the clip 936 to obstruct and/or bias the knob 928 against rotation about a longitudinal axis 942 of the screw 902.

In the illustrated embodiment, the clip 936 includes a base 1010 from which the first prong 938 and the second prong 940 extend. The base 1010 and the first prong 938 and the second prong 940 cooperate to wrap around the portion of the periphery 1000 of the pin 901. In the illustrated embodiment, the base 1010, the first prong 938, and the second prong 940 are integral or unitary. In other embodiments, the first prong 938 and/or the second prong 940 are coupled to the base 1010. The base 1010 includes an aperture or passage 1012 disposed along a central, longitudinal axis 942 of the base 1010.

The first prong 938 of FIG. 17 has a first spring rate and applies a first spring force to the catch 934 of the knob 928 when the knob 928 is in a locked position. In the illustrated embodiment, the first prong 938 has a first size and a first shape that enables the first prong 938 to have the first spring rate and to apply the first spring force to the catch 934 of the knob 928 when the knob 928 is in a locked position. For example, in the illustrated embodiment, the first prong 938 includes a first aperture 1014, which is generally oval. The first prong 938 also has a first point of inflection 1016 and a second point of inflection 1018. A shape and/or a size of the first aperture 1014, a number of points of inflection of the first prong 938, a curvature of the first prong 938, and/or other aspects of the shape and the size of the first prong 938 (e.g., thickness or length) affect a spring rate of the first prong 938 and a spring force applied by the first prong 938 to the catch 934 of the knob 928 For example, the first prong 938 with the first aperture 1014 has a lesser spring rate and applies a lesser force to the catch 934 than the first prong 938 without the first aperture 1014. Therefore, a shape and/or a size of the first prong 938 (e.g., a shape and/or a size of the first aperture 1014) may be different in other embodiments to enable the first prong 938 to have other spring rates and/or apply other forces to the catch 934. The first aperture 1014 reduces a weight of the clip 936 relative to the clip 936 without the first aperture 1014. Material selection of the first prong 938 may also affect the spring force applied, as is described above.

The second prong 940 of FIG. 17 has a second spring rate and applies a second spring force to the catch 934 of the knob 928 when the knob 928 is in the locked position. In the illustrated embodiment, the second prong 940 has a second size and a second shape that enables the second prong 940 to have the second spring rate and to apply the second spring force to the catch 934 of the knob 928. For example, in the illustrated embodiment, the second prong 940 includes a second aperture 1020 located along the second prong 940. The second aperture 1020 of FIG. 17 is generally oval. The second prong 940 also has a third point of inflection 1022 and a fourth point of inflection 1024. A shape and/or a size of the second aperture 1020, a number of points of inflection of the second prong 940, a curvature of the second prong 940, and/or other aspects of the shape and the size of the second prong 940 (e.g., thickness or length) affect a spring rate of the second prong 940 and a spring force applied by the second prong 940 to the catch 934 of the knob 928. For example, the second prong 940 with the second aperture 1020 has a lesser spring rate and applies a lesser force to the catch 934 than the second prong 940 without the second aperture 1020. Therefore, a shape and/or a size of the second prong 940 (e.g., a shape and/or a size of the second aperture 1020) may be different in other embodiments to enable the second prong 940 to have other spring rates and/or apply other forces to the catch 934. Material selection of the first prong 938 may also affect the spring force applied, as is described above.

The first prong 938 includes a first curved lip 1026. In the illustrated embodiment, the first curved lip 1026 includes a first vertex 1028. The second prong 940 includes a second curved lip 1030. In the illustrated embodiment, the second curved lip 1030 includes a second vertex 1032. In some embodiments, the first vertex 1028 and the second vertex 1032 contact the first flat surface 1006 and the third flat surface, respectively, when the knob 928 is in a first locked position. In other embodiments, the first prong 938 and/or the second prong 940 have other configurations and/or features. For example, the first prong 938 and/or the second prong 940 may have teeth, notches, and/or one or more additional and/or alternative features that enable the first prong 938 and/or the second prong 940 to engage the catch 934.

Figure 18:
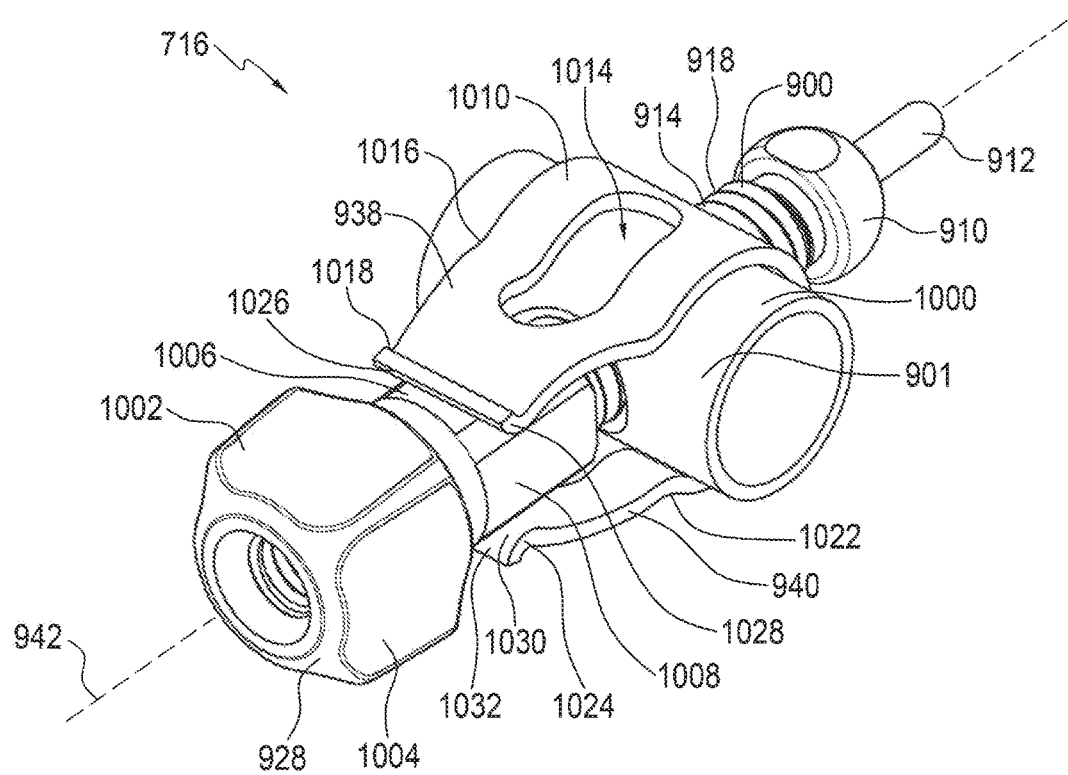
FIG. 18 is a perspective view of the adjustable rod assembly of FIG. 17.

FIG. 18 is a perspective view of the clip 936 engaging the catch 934 of the knob 928 to substantially obstruct and/or bias the knob 928 and thus, the rod 902 against rotation about the longitudinal axis 942 of the knob 928. The clip 936 obstructs and/or biases the knob 928 and the rod 902 against rotation about the longitudinal axis 942 of the rod 902 by contacting the flat surfaces 1006, 1008 and/or applying spring forces to the catch 934. For example, during operation of the lever assembly 704, the first vertex 1028 of the first curved lip 1026 and the second vertex 1032 of the second curved lip 1030 engage the first flat surface 1006 and the third flat surface, respectively, and apply spring forces to the catch 934 to hold the knob 928 and, thus, the rod 902. As a result, the spring forces bias the rod 902 against rotation about the longitudinal axis 942.

Although the clip 936 applies force to the knob 928 that biases the knob 928 against rotation during operation and/or actuation of the lever assembly 704, the rider or technician may overcome the force to rotate the knob 928 to adjust the longitudinal position of the knob 928 and, thus, the reach of the lever assembly 704 as described above with reference to FIG. 16.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A lever assembly for a bicycle, comprising:
   an anchoring member;

a lever pivotably coupled to the anchoring member;

a rod threadably coupled to the anchoring member and operatively coupled to the lever; and an anchoring member retaining device disposed around a portion of the anchoring member, the retaining device including a first extension and a second extension configured to obstruct rotation of the rod about a longitudinal axis of the rod, wherein the rod includes at least one flat surface to be engaged by the first extension, and rotation of the rod about the longitudinal axis of the rod adjusts a position of the lever, wherein the retaining device is a clip disposed around the anchoring member, the first extension is a first prong and the second extension is a second prong, wherein the first prong is configured to engage a first surface disposed on a first side of the rod, the second prong configured to engage a second surface disposed on a second side of the rod.

2. The lever assembly of claim 1, wherein the first extension includes a first end portion, the second extension includes a second end portion, and wherein the first end portion and the second end portion engage the rod.

3. The lever assembly of claim 1, further comprising a knob rotatably affixed to the rod.

4. The lever assembly of claim 3, wherein the first extension and the second extension engage the knob.

5. The lever assembly of claim 1, wherein the rod includes a mating section, the first extension and the second extension engaging the mating section.

6. The lever assembly of claim 5, wherein the rod extends through a first aperture and a second aperture of the retaining device.

7. The lever assembly of claim 5, wherein the first extension includes a notch to receive a portion of the rod.

8. The lever assembly of claim 1 further comprising a knob coupled to the rod, wherein the knob defines the first surface and the second surface.

9. The lever assembly of claim 8, wherein the knob is threadably coupled to the rod.

10. The lever assembly of claim 1, wherein the rod includes a socket to receive a tool.

11. The lever assembly of claim 1 further comprising a piston operatively coupled to the rod.

12. The lever assembly of claim 1, wherein the first extension includes a first lip to engage the first surface.

13. The lever assembly of claim 1, wherein the first extension includes a first tooth to engage the first surface.

14. A control lever assembly for a bicycle, the lever assembly comprising:

an anchoring member;

a lever coupled to the anchoring member;

a rod adjustably coupled to the anchoring member; and a retaining device coupled to the anchoring member and operatively coupled to the rod to apply a clamping force to bias the rod against rotation about a longitudinal axis of the rod, wherein the rod includes a flat surface, the retaining device contacts the flat surface, and the lever is pivotably coupled to the anchoring member, wherein the retaining device is a clip disposed around the anchoring member, the first extension is a first prong and the second extension is a second prong, wherein the first prong is configured to engage a first surface disposed on a first side of the rod, the second prong configured to engage a second surface disposed on a second side of the rod.

15. The control lever assembly of claim 14, wherein the rod includes a mating section shaped to matingly engage the retaining device, and wherein the retaining device clamps to the mating section.

16. The control lever assembly of claim 14 further comprising a knob coupled to the rod, the retaining device clamped to the knob to operatively couple the retaining device to the rod.

17. The control lever assembly of claim 16, wherein the knob is threadably coupled to the rod.

18. The control lever assembly of claim 14, wherein the retaining device includes an end portion having a first tooth.

19. The control lever assembly of claim 18, wherein the end portion includes a second tooth defining a notch between the first tooth and the second tooth, and wherein a portion of the rod is received in the notch.

20. The control lever assembly of claim 14 further comprising a linkage pivotably coupled to the lever, the linkage having a socket, wherein a portion of the rod is received in the socket.

* * * * *